Patented Feb. 22, 1927.

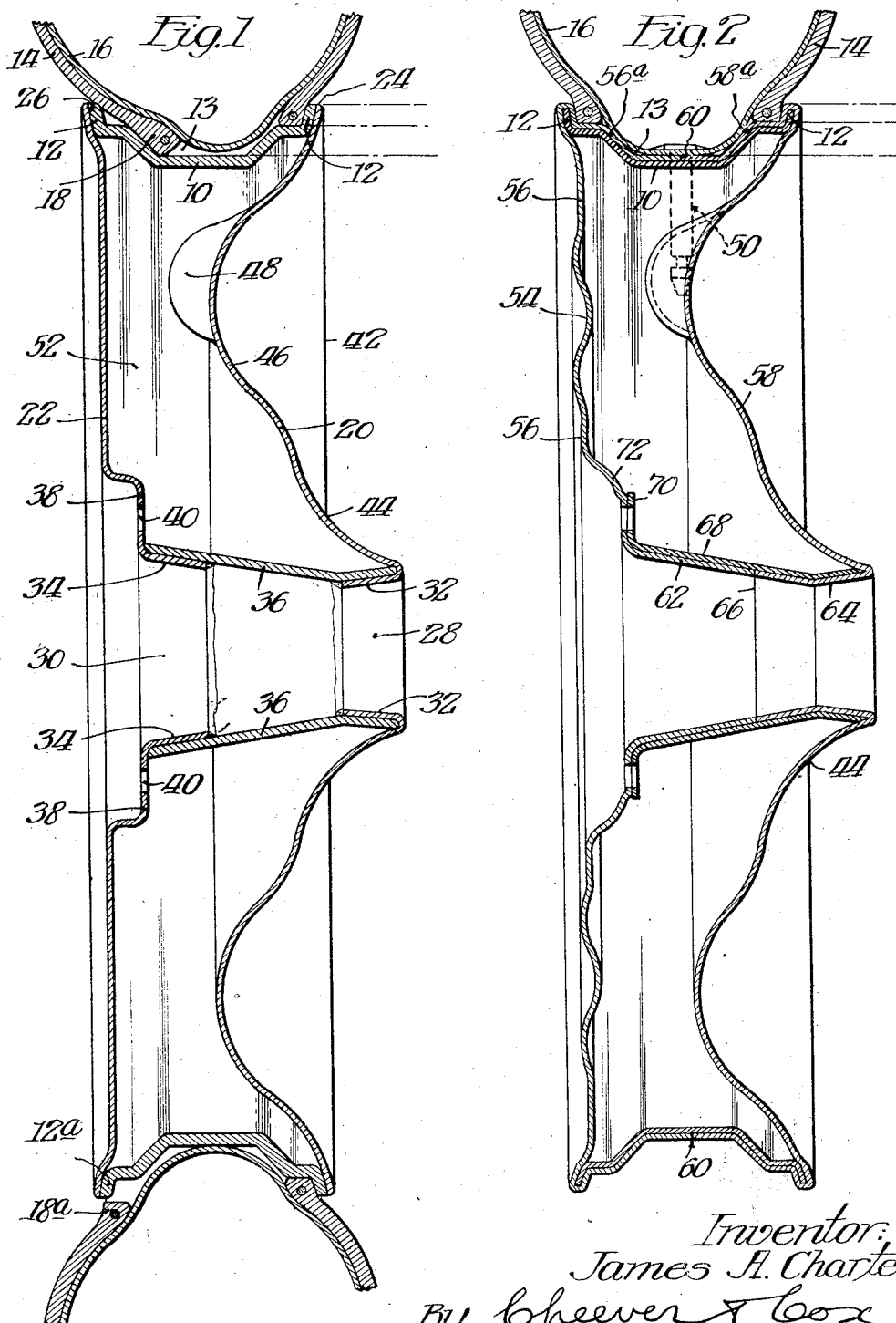

1,618,813

UNITED STATES PATENT OFFICE.

JAMES A. CHARTER, OF CHICAGO, ILLINOIS.

METAL WHEEL.

Application filed January 19, 1924. Serial No. 687,198.

This invention relates to metal wheels, particularly those of the double disc type.

The objects of the invention are: to make a wheel of this class, provided with a hollowed or dished rim of the conventional type heretofore used on other types of wheels, which permit the removal of deflated tires, particularly straight-sided ones, without removing a rim flange, and to provide a wheel of this class which is unusually strong and rigid in proportion to weight and consequent cost.

The invention consists in a device attaining the foregoing and other objects which can be easily and cheaply made, which is satisfactory in use and is not readily liable to get out of order.

Referring to the accompanying drawings in which like numerals designate the same parts;—

Figure 1 is transverse, central sectional view of one form of wheel illustrating this invention;

Figure 2 is the same sort of view of another wheel illustrating the invention in its preferred form.

Both wheels disclosed in the drawings include substantially identical, conventionally dished or hollow metal rims 10, having outer integral, rigid rim flanges 12, of sufficiently greater diameter than that of the central dished or recessed surface 13 so that when the tire 14, enclosing inner tube 16, is inflated as shown in Figure 2, the tire is retained on the wheel between the rim flanges 12 and that when the tire is deflated as shown in Figure 1, the side edge 18 of the tire on one side of the rim, specifically the top as shown in Figure 1, enters the recess 13 thereby allowing the opposite side edge 18ª of the tire side to clear the adjacent rim portion 12ª and thereby start the removal of the tire from the rim and wheel in obvious conventional manner.

In the wheel of Figure 1 the rim 10 is secured to and supported on the circumferential edges of two spaced metal discs 20 and 22. In the particular case here illustrated, the discs are secured to the rim by direct welding along seams 24 and 26 respectively. The use of two discs makes a very strong, light wheel and at the same time hides from view the more or less unsightly depressed rim 10. Both discs are provided with corresponding hub perforations 28 and 30, bordered respectively with inturned integral hubs 32 and 34 suitably secured, preferably by welding to a tubular hub member 36.

Disc 22 is the rear disc and is, therefore, conventionally inwardly indented at 38. The indented portion is provided with conventional means, specifically bolt or pin holes 40, for driving attachment to the vehicle.

The hub 32 of the outside or front disc 30 of the wheel is conventionally located outside the plane 42 of the front edge of the wheel and the disc is itself bent inward behind this surface 42, from a point 44 quite close to the hub center, in an indentation or recess 46 of more or less conventional form. The indented portion 46 is at one point provided with supplemental indentation 48 adapted as shown in Figure 2 to receive the valve stem 50 of tire inner tube 16. As clearly shown in Figure 1, there is, as in all box wheels, a substantial air space 52 between the discs.

Figure 1 illustrates an embodiment of the invention in which the rear disc 22 is substantially smooth and flat. It may, however, be made with corrugations such as those shown at 54 on the rear disc 56 of the wheel of Figure 2.

The structure of Figure 2 differs from that of Figure 1 only in the replacing of rear disc 22 with disc 56 and front disc 46 with disc 58. Each of said discs are extended and in manufacture bent over the adjacent rim flanges 12 and the top surface of the rim 10 in the portions 56ª and 58ª respectively, which meet each other in the circumferential line 60 where they are preferably welded together. Said supplemental parts 56ª and 58ª are also preferably welded to the upper surface of the rim 10, so as to be substantially integral therewith. In Figure 2 the weld seams 24 and 26 of Figure 1 are present and are extended over the entire upper surface of the rim 10.

In the structure of Figure 2 the hub portions 62 and 64 of each of the discs 56 and 58 are extended inward until they meet in the circumferential line 66 and are welded to the inner surface of reinforcing hub 68 corresponding to hub 36 and differing from it only in the presence of a flange 70 reinforcing indented portion 72 of disc 56 corresponding to portion 38 of disc 22 heretofore described.

While the best construction for the wheel of Figure 2 is to reinforce the disc extensions 56ª and 58ª with the rim 10 to which they are welded, it is obvious that if the discs and their extensions are of sufficiently thick metal, the extensions may be simply welded along the line 60 and the metal rim 10 proper may be entirely omitted. In other words, the whole rim may be formed from the extensions 56ª and 58ª integral with the respective discs, the weld being along line 60.

The wheels are obviously used in connection with vehicles by conventionally slipping a wheel hub 36 or 68, as the case may be, over a conventional axle hub and securing it in place.

Having thus described my invention, what I claim and desire to secure by Letters Patent is:

1. In mechanism of the class described, in combination with a flanged rim, recessed to permit the removal of a deflated tire casing over a rim flange, a wheel hub and a pair of separated discs turned inside and welded to the wheel hub and secured to the rim by welding.

2. In mechanism of the class described, in combination with a flanged rim, recessed to permit the removal of a deflated tire casing over a rim flange, a wheel hub and a pair of separated discs supported by the hub and secured to the rim by welding, portions of the discs being bent over and secured to the outer surface of the rim.

3. In mechanism of the class described, in combination with a flanged rim, recessed to permit the removal of a deflated tire casing over a rim flange, a wheel hub and a metal disc sustained by the hub and secured to the rim by welding, a portion of the disc being bent over and secured to the outer surface of the rim.

4. In a disc wheel a hub, two separated discs carried thereby, the outer edges of the discs being bent inwardly to form the tire receiving surface of a flanged rim depressed at its center to permit the removal of a deflated tire as described.

5. In a disc wheel a hub, two separated discs carried thereby, the outer edges of the discs being bent inwardly until they meet each other, to form the tire receiving surface of a flanged rim depressed at its center to permit the removal of a deflated tire as described.

6. As an article of manufacture a metallic hollow box disc wheel having a rim with rigid outer flanges and a depressed center circumferential portion adapted to permit removal of a deflated tire, the tire receiving surface of the rim being formed of integral parts of said discs.

7. As an article of manufacture a metallic hollow box disc wheel having a rim with rigid outer flanges and a depressed center circumferential portion adapted to permit removal of a deflated tire, the tire receiving surface of the rim being formed of integral parts of said discs meeting in approximately the center of depressed part of the rim and being there secured together.

8. In mechanism of the class described, in combination with a flanged rim, recessed to permit the removal of a deflated tire casing over a rim flange, a metal double disc wheel having the rim welded thereto, the disc wheel being perforated and turned in to fit inside of the wheel hub, and welded thereto.

9. In mechanism of the class described, in combination with a flanged rim, recessed to permit the removal of a deflated tire casing over a rim flange, a metal double disc wheel sustaining said rim, the disc wheel being perforated and turned in to fit on an axle hub.

In witness whereof, I have hereunto subscribed my name.

JAMES A. CHARTER.